United States Patent
Eggleton et al.

(10) Patent No.: US 11,874,872 B2
(45) Date of Patent: Jan. 16, 2024

(54) SYSTEM EVENT DETECTION SYSTEM AND METHOD

(71) Applicant: Palantir Technologies Inc., Denver, CO (US)

(72) Inventors: Andrew Eggleton, Doha (QA);
Alexandra Serenhov, Stockholm (SE);
Ankit Shankar, San Francisco, CA (US); Brandon Helms, Arnold, MD (US); Brian Keohane, New York, NY (US); Darren Zhao, New York, NY (US); Elliot Colquhoun, Sydney (AU);
Gautam Punukollu, New York, NY (US); Morten Kromann, Copenhagen (DK); Nikhil Seetharaman, Palo Alto, CA (US); Ranec Highet, Hertfordshire (GB); Raj Krishnan, Mumbai (IN);
Xiao Tang, Singapore (SG); Sriram Krishnan, New York, NY (US); Simon Vahr, London (GB); Tareq Alkhatib, Richmond (CA); Thomas Mathew, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 648 days.

(21) Appl. No.: 16/660,217

(22) Filed: Oct. 22, 2019

(65) Prior Publication Data
US 2023/0394083 A1 Dec. 7, 2023

(30) Foreign Application Priority Data
Oct. 4, 2019 (GB) ..................................... 1914344

(51) Int. Cl.
G06F 21/00 (2013.01)
G06F 16/901 (2019.01)
(Continued)

(52) U.S. Cl.
CPC ........ *G06F 16/9024* (2019.01); *G06F 21/552* (2013.01); *G06F 21/554* (2013.01);
(Continued)

(58) Field of Classification Search
CPC .. G06F 16/9024; G06F 21/552; G06F 21/554; H04L 63/1416; H04L 63/1425; H04L 63/1433; H04L 63/20
See application file for complete search history.

(56) References Cited

U.S. PATENT DOCUMENTS

| | | |
|---|---|---|
| 9,225,730 B1 | 12/2015 | Brezinski |
| 2015/0032745 A1* | 1/2015 | Chan ........................ G06F 16/28 707/736 |

(Continued)

FOREIGN PATENT DOCUMENTS

| | | |
|---|---|---|
| EP | 3179696 | 6/2017 |
| WO | WO 2017/180666 | 10/2017 |

OTHER PUBLICATIONS

Official Communication for European Patent Application No. 19204666.2 dated Apr. 20, 2020, 10 pages.

*Primary Examiner* — Michael M Lee
(74) *Attorney, Agent, or Firm* — Knobbe, Martens, Olson & Bear, LLP

(57) ABSTRACT

A method, performed by one or more processors, including: receiving one or more event records; generating, using the one or more event records, an event descriptor object descriptive of one or more events occurring in a networked system, wherein the event descriptor object comprises a plurality of event properties; receiving one or more entity records; generating, using the one or more entity records, an entity descriptor object descriptive of one or more entities relevant to the security of the networked system, wherein the entity descriptor object comprises a plurality of entity properties; incorporating, into an object graph, the event descrip- (Continued)

tor object and the entity descriptor object; and associating, in the object graph, the event descriptor object with the entity descriptor object using at least one of the plurality of event properties and at least one of the plurality of entity properties.

17 Claims, 7 Drawing Sheets

(51) Int. Cl.
H04L 9/40 (2022.01)
G06F 21/55 (2013.01)
(52) U.S. Cl.
CPC ...... *H04L 63/1416* (2013.01); *H04L 63/1425* (2013.01); *H04L 63/1433* (2013.01); *H04L 63/20* (2013.01)

(56) References Cited

U.S. PATENT DOCUMENTS

| | | | |
|---|---|---|---|
| 2015/0379158 A1* | 12/2015 | Infante-Lopez | G06F 16/9024 707/798 |
| 2016/0180245 A1* | 6/2016 | Tereshkov | G06N 20/00 706/12 |
| 2016/0188748 A1* | 6/2016 | Neumann | G06F 16/2255 707/747 |
| 2017/0063909 A1* | 3/2017 | Muddu | G06F 3/0484 |
| 2017/0171235 A1* | 6/2017 | Mulchandani | G06F 21/554 |
| 2017/0300690 A1* | 10/2017 | Ladnai | G06F 21/56 |
| 2019/0050563 A1* | 2/2019 | Sander | G06F 16/287 |
| 2019/0182273 A1* | 6/2019 | Walsh | H04L 63/1425 |
| 2019/0188332 A1* | 6/2019 | Ingvaldsen | G06F 16/9024 |
| 2019/0361900 A1* | 11/2019 | Rogynskyy | G06F 16/2379 |

* cited by examiner

SYSTEM EVENT DETECTION SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to systems and methods for analysis of cybersecurity data.

Description of the Related Art

Organizations cannot mitigate cybersecurity threats that they cannot observe or understand. Information indicative of cybersecurity threats may be in a format that security analysts cannot easily understand or analyze, e.g., raw log files. Furthermore, data associated with the cybersecurity threat may be inaccessible, or at least difficult to access, by security analysts. Therefore, suspicious cybersecurity events occurring in organizations' systems may not be detected or, if detected, the inaccessibility of the associated data may prevent such events from being usefully analyzed. For example, the inaccessibility of the associated data may prevent the protection and integrity of an organization's data and information system's assets.

SUMMARY

According to a first aspect of the specification, there is provided a method, performed by one or more processors, including: receiving one or more event records; generating, using the one or more event records, an event descriptor object descriptive of one or more events occurring in a networked system, wherein the event descriptor object comprises a plurality of event properties; receiving one or more entity records; generating, using the one or more entity records, an entity descriptor object descriptive of one or more entities relevant to the security of the networked system, wherein the entity descriptor object comprises a plurality of entity properties; incorporating, into an object graph, the event descriptor object and the entity descriptor object; and associating, in the object graph, the event descriptor object with the entity descriptor object using at least one of the plurality of event properties and at least one of the plurality of entity properties.

The one or more events occurring in the networked system may be suspicious system events indicative of a cybersecurity threat.

The object graph may include a path between the event descriptor object and a course of action entity descriptor object descriptive of one or more actions for mitigating the cybersecurity threat.

Receiving the one or more entity records may include receiving a first one or more entity records from a first entity record source and receiving a second one or more entity records from a second entity source. The first entity record source may be a system log. The second entity record source may be a security monitoring application.

Generating the entity descriptor object may include determining that a first entity property of the plurality of entity properties is to be extracted from the first one or more entity records and extracting the first entity property from the first one or more entity records. Generating the entity descriptor object may further include determining that a second entity property of the plurality of entity properties is to be extracted from the second one or more entity records and extracting the second entity property from the second one or more entity records.

Generating the entity descriptor object may include determining that a value for an entity property of the plurality of entity properties is contained in both the first one or more entity records and the second one or more entity records; determining that the first entity record source is a more reliable entity record source for the event property; and extracting the entity property from the first one or more entity records. The at least one of the plurality of entity properties may include the entity property. Associating the entity descriptor object with the event descriptor may use the value for the entity property contained in the second one or more entity records.

The method may further include: receiving one or more second entity records; generating, using the one or more second entity records, a second entity descriptor object descriptive of a second one or more entities relevant to the security of the networked system, wherein the second entity descriptor object comprises a plurality of second entity properties; incorporating, into the object graph, the second entity descriptor object; and associating, in the object graph, the second entity descriptor object with the entity descriptor object using at least one of the plurality of second entity properties and at least one of the plurality of entity properties.

The method may include analyzing, using one or more data analysis software components, at least part of the object graph, wherein analyzing the at least part of the object graph comprises deriving one or more cybersecurity indicators for the one or more entities using the association between the event descriptor object and the entity descriptor object.

The method may include: sending, to a client device, a representation of the event descriptor object for display; receiving, from the client device, a request for information associated with the event descriptor object; in response to the request, locating, in the object graph, one or more objects associated with the event descriptor object, wherein the one or more objects comprise the entity descriptor object; and sending, to the client device, a representation of the one or more objects for display.

The method may include receiving, from the client device, a request for information associated with the entity descriptor object; in response to the request, locating, in the object graph, a second one or more objects associated with the entity descriptor object, wherein the second one or more objects comprise another entity descriptor object; and sending, to the client device, a representation of the second one or more objects for display.

The method may include receiving, from the client device, a request for details of one or more actions for mitigating a cybersecurity threat indicated by the event descriptor object; in response to the request, locating, in the object graph, one or more course of action entity descriptor objects descriptive of one or more actions for mitigating the cybersecurity threat, wherein the object graph comprises a path between the event descriptor object and the course of action entity descriptor object; and sending, to the client device, a representation of the course of action entity descriptor object for display.

According to a second aspect, there is provided a method, performed by one or more processors, including: receiving, from a server device, a representation of an event descriptor object descriptive of one or more events occurring in a networked system, wherein the representation of the event descriptor object includes a plurality of event properties; displaying the plurality of event properties; receiving an input indicative of a request for information associated with the event descriptor object; sending, to the server device, a request for information associated with the event descriptor object; and receiving, from the server device, a representation of an entity descriptor object descriptive of one or more entities relevant to the security of the networked system wherein: the representation of the entity descriptor object includes a plurality of entity properties; and the entity descriptor object is associated with the event descriptor object in an object graph at the server device; and displaying the plurality of entity properties.

The method may include sending, to the server device, a request for information associated with the entity descriptor object; receiving, from the server device, a representation of a second entity descriptor object descriptive of a second one or more entities relevant to the security of the networked system, wherein: the representation of the second entity descriptor object includes a plurality of second entity properties; and the second entity descriptor object is associated with the entity descriptor object in the object graph at the server device; and displaying the plurality of second entity properties.

The method may include sending, to the server device, a request for details of one or more actions for mitigating a cybersecurity threat indicated by the event descriptor object; receiving, from the server device, a representation of a course of action entity descriptor object descriptive of one or more actions for mitigating the cybersecurity threat, wherein: the representation of the course of action entity descriptor object comprises a plurality of course of action entity properties; and the object graph at the server device comprises a path between the event descriptor object and the course of action entity descriptor object; and displaying the plurality of course of action entity properties.

According to a third aspect, there is provided a computer program, optionally stored on a non-transitory computer readable medium, which, when executed by one or more processors of a data processing apparatus cause the data processing apparatus to carry out any method described above.

According to a fourth aspect, there is provided an apparatus configured to carry out any method described above, the apparatus including one or more processors.

According to a fifth aspect, there is provided a system including: one or more server devices including one or more processors configured to carry out any method described in relation to the first aspect; and one or more client devices including one or more processors configured to carry out any method described in relation to the second aspect.

According to another aspect, a computing system comprises a hardware computer processor, a non transitory computer readable medium having software instructions stored thereon, the software instructions executable by the hardware computer processor to cause the computing system to perform operations comprising: receiving one or more event records, generating, using the one or more event records, an event descriptor object descriptive of one or more events occurring in a networked system, wherein the event descriptor object comprises a plurality of event properties, receiving one or more entity records, generating, using the one or more entity records, an entity descriptor object descriptive of one or more entities relevant to the security of the networked system, wherein the entity descriptor object comprises a plurality of entity properties, incorporating, into an object graph, the event descriptor object and the entity descriptor object, and associating, in the object graph, the event descriptor object with the entity descriptor object using at least one of the plurality of event properties and at least one of the plurality of entity properties.

According to another aspect, a system comprises one or more server devices comprising one or more processors configured to perform operations comprising receiving one or more event records, generating, using the one or more event records, an event descriptor object descriptive of one or more events occurring in a networked system, wherein the event descriptor object comprises a plurality of event properties, receiving one or more entity records, generating, using the one or more entity records, an entity descriptor object descriptive of one or more entities relevant to the security of the networked system, wherein the entity descriptor object comprises a plurality of entity properties, incorporating, into an object graph, the event descriptor object and the entity descriptor object; and associating, in the object graph, the event descriptor object with the entity descriptor object using at least one of the plurality of event properties and at least one of the plurality of entity properties. The system may further comprise one or more client devices comprising one or more processors configured to perform operations comprising: receiving, from a server device, a representation of an event descriptor object descriptive of one or more events occurring in a networked system, wherein the representation of the event descriptor object comprises a plurality of event properties, displaying the plurality of event properties, receiving an input indicative of a request for information associated with the event descriptor object, sending, to the server device, a request for information associated with the event descriptor object; and receiving, from the server device, a representation of an entity descriptor object descriptive of one or more entities relevant to the security of the networked system wherein the representation of the entity descriptor object comprises a plurality of entity properties; and the entity descriptor object is associated with the event descriptor object in an object graph at the server device; and displaying the plurality of entity properties.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Cybersecurity Ontology

Figure 1:
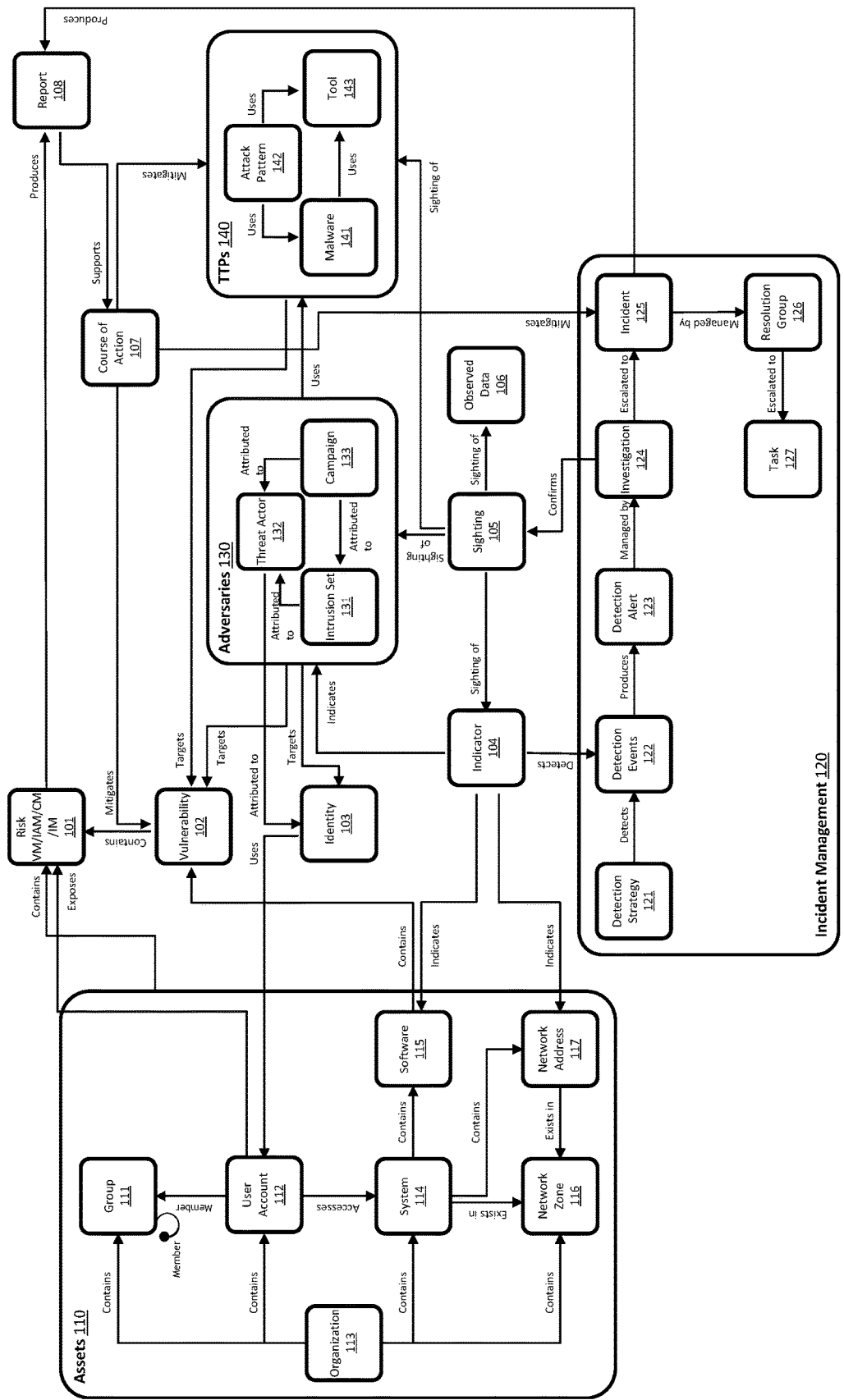
FIG. 1 is a diagrammatic illustration of an ontology for cybersecurity analysis.

FIG. 1 is a diagrammatic illustration of an example ontology 100 for cybersecurity analysis.

The ontology 100 defines objects and object relationships for representing cybersecurity data. The ontology 100 includes objects descriptive of events, e.g., suspicious system events, and objects descriptive of entities relevant to the security of a networked system, e.g., user accounts and/or software.

The ontology 100 may include a risk object 101. The risk object 101 represents a vulnerability management (VM) risk, a configuration management (CM) risk, an inventory management (IM) risk and/or an Identity and Access Management (IAM) risk. The risk object 101 may include a plurality of properties, e.g., a severity level, a risk description, an identifier for the risk, a type of the risk and/or a source of the risk. Where the risk is an IAM risk, the risk object may include a description and/or a codified representation of user actions and/or behaviors underlying the IAM risk.

The ontology 100 may include a vulnerability object 102. The vulnerability object 102 represents vulnerabilities of software and/or systems of a networked system. The vulnerability object 102 may include a plurality of properties, e.g., a vulnerability name; a zero-day date; a disclosure date; a vulnerability severity level; a description and/or codified representation of a mechanism or mechanism type underlying the vulnerability; and/or analyst notes relating to the vulnerability.

The ontology 100 may include an identity object 103. The identity object 103 represents a person and/or group, e.g., a natural person; a legal entity; a non-governmental organization; a government or agency thereof, and/or an informal grouping. The identity object may include a plurality of properties, e.g., a name representing the identity, an identifier (e.g., a key) for the identity; a type of the identity; a department of the identity; and a hazard level associated with the identity.

The ontology 100 may include an indicator object 104. The indicator object 104 is a collection of properties used to facilitate the detection of a suspicious security event. The indicator object 104 may also be referred to as an 'indicator of compromise' object. The indicator object 104 may include a plurality of properties, e.g., an identifier (e.g., key) for the suspicious security event; a type of the suggested suspicious security event; one or more properties of other entities or events suggestive of a suspicious security event; rules, using the one or more properties, for determining whether a suspicious security event has occurred; a severity level for the indicator and a description of the indicator.

The ontology 100 may include a sighting object 105. The sighting object 105 represents sightings of other entities and/or events represented by objects in the ontology 100. The sighting object 105 may include a plurality of properties, e.g., a date and/or time of the sighting; a name or identifier of the security analyst performing the sighting; an indicated urgency of analysis for the sighting; a name or identifier of software used in the sighting; and/or a description of the sighting.

The ontology 100 may include an observed data object 106. The observed data object 106 represents cybersecurity relevant observed data and related properties. The observed data object 106 may include the observed data itself, a transformation of the observed data, e.g., a transformation of the observed data to facilitate analysis; and/or one or more properties, e.g., a source of the observed data; and/or an identifier (e.g., key) for the observed data.

The ontology may include a course of action descriptor 107. The course of action descriptor 107 represents a course of action, e.g., one or more actions, that may be performed to mitigate and/or remedy a security incident and/or vulnerability. The course of action descriptor 107 may include a description of one or more steps to be taken to mitigate and/or remedy the security incident and/or vulnerability. Examples of steps which may be taken to mitigate and/or remedy the security incident and/or vulnerability may include patching one or more software applications or operating systems; blocking one or more computing devices from a network; removing permissions from one or more user accounts; and/or deleting one or more files. The description of the one or more steps may be a written description of each of the one or more steps. Alternatively or additionally, the description of the one or more steps may include a tabular or object representation of the one or more steps to be taken, e.g., a step table row or step object for each step with each step row or object including, for example, an action type; an action name and/or an action identifier. The course of action descriptor may include a plurality of properties, e.g., a course of action identifier (e.g., a key); a course of action name and/or an urgency of performing the course of action.

The ontology 100 may include a report object 108. The report object 108 may represent a report describing security risks and/or incidents. The report object 108 may include a human readable report, e.g., a representation of a security report as a document or a web page; a description of the security risk and/or incident; one or more links to information related to the report; one or more files related to the report; and/or one or more properties, e.g., a name for the report and/or an identifier (e.g., key) for the report.

The ontology 100 may include an asset grouping 110. The asset grouping 110 may represent the assets of a networked system. The objects within the asset grouping may include a group object 111, a user account object 112, an organization object 113, a system object 114, a software object 115, a network zone object 116 and/or a network address object 117.

The group object 111 represents a group including user accounts and/or user account groups. The group may correspond with a permission set to be granted to members of the group. The group may be a grouping of user accounts for a department, of a certain user type and/or users having certain properties, or may be an abstract grouping for system management purposes. The group object 111 may include a plurality of properties of the group, e.g., a group name, a group identifier, and a list of system permissions associate with the group.

The user account object 112 represents a user account. The user account object 112 may include a plurality of properties of the user account, e.g., a username of the user account; a user account type; a user account identifier (e.g., key); and/or permissions associated with the user account.

The organization object 113 represents an organization. The represented organization may be the owner and/or consumer of the networked system. The represented organization may be a business; a legal entity; a non-governmental organization; or a government or agency thereof. The organization may be associated with a system domain, e.g., an Active Directory domain. The organization object may include a plurality of properties of and/or related to the organization, e.g., an organization name; an organization type; an associated system domain and/or an organization identifier.

The system object 114 represents a computing device of the networked system. The computing device may be any type of computing device within the networked system, e.g., a desktop computer, a laptop computer or a mobile device. The system object may include properties of the computing device, e.g., a device name, a hostname for the device, a device type, details of the device hardware and/or an identifier (e.g., key) for the device.

The software object 115 represents a software program, software package and/or software library. The software object may include a plurality of properties, e.g., a name of the software; a version of the software; and/or an identifier (e.g., key) for the software.

The network zone object 116 represents a network zone of the networked system. The network zone may be a collection of computing devices using the same or a similar access control policy. The network zone object 116 may include a plurality of properties of the network zone, e.g., a network zone name; a type of the network zone, e.g., internal only or exposed to the Internet; a purpose of the zone, e.g., the zone may be DMZ for web and/or email serving; a description of the zone; a geographical or logical location of the network zone; and/or an identifier (e.g., key) for the zone.

The network address object 117 represents a network address. The network address object 117 includes the network address. Additionally, the network address object may include properties associated with the network address. These properties may include another network address corresponding or associated with the network, e.g., where the network address is an IPv4 network address for a dual-stack network adapter, the IPv6 network address for the dual-stack network adapter. The properties may also include the Uniform Resource Locator (URL) from which the network address was resolved. The properties may also include any or all of: a type of the network address; a date and/or time at which the network address appeared in the network; and/or an identifier for the network address.

The ontology 100 may include an incident management grouping 120. The incident management grouping 120 may represent a workflow for managing security incidents. The objects within the incident management grouping may include a detection strategy object 121, a detection event object 122, a detection alert object 123, an investigation object 124, an incident object 125, a resolution group object 126 and a task object 127.

The detection strategy object 121 represents a strategy usable for detecting suspicious system events. The detection strategy object 121 may represent a detection strategy performable by human analysts and/or may represent a detection strategy performed automatically, e.g., using a suspicious event detection rule. For human analyst detection strategies, the detection strategy object 121 may include a description of blocks performed or to be performed by a human analyst for detecting the relevant type of suspicious system events. For automatic detection strategies, the detection strategy object 121 may include a representation of a rule and/or code for detecting suspicious system events, e.g., computer code or security rule markup. The representation of the rule and/or code for detecting suspicious system events may be used by or derived from the indicator object. The detection strategy object 121 may include a plurality of properties, e.g., a name of the detection strategy; a type of the detection strategy, e.g., manual or automatic; and/or an identifier (e.g., key) for the detection strategy.

The detection event object 122 may represent an event detected using a detection strategy. The detection event object 122 may include a plurality of properties, e.g., a name of the detection strategy used to detect the event; a name of the detected event; a date and/or time at which the event was detected; and/or an identifier for the detected event.

The detection alert object 123 may represent an alert raised on the basis of a detected event. The detected event may be an event which was manually detected, e.g., by a user, or an event which was automatically detected. The detection alert object 123 may include a plurality of properties, e.g., a severity level of the alert; a date and/or time at which the alert was raised; a name of the security analyst producing the alert; a name of the alert; and an identifier (e.g., key) for the alert.

The investigation object 124 represents a security investigation prompted by one or more detection alerts. The detection alert may be generated automatically by A manually created detection alert may be created in response to a user tipoff. The investigation object 124 may include a plurality of properties, e.g., a name for the security investigation; an urgency level for the security investigation; a date and/or time at which the security investigation was started; a type of the security investigation; and/or an identifier (e.g., key) for the security investigation.

The incident object 125 represents a security incident. The security incident may have been determined to have occurred by a security investigation, e.g., a security investigation represented by an investigation object 124. The incident object may include a plurality of properties, e.g., a name for the security incident; a severity level of the security incident; a type of the security incident; a date and/or time of the security incident; and/or an identifier (e.g., key) for the security incident.

The resolution group object 126 represents a resolution group for managing security incidents. The resolution group may be used to group a number of related security incidents that may be resolved using a similar methodology. The resolution group object 126 may include a plurality of properties, e.g., a name for the resolution group; an urgency of resolution; a type of the resolution group; and/or an identifier (e.g., key) for the resolution group.

The task object 127 represents one or more tasks to be performed to resolve the security issue underlying the incidents of the resolution group. The task object 127 may include a description of tasks to resolve the security issue. Examples of tasks which may be performed to resolve the security issue may include patching one or more software applications or operating systems; blocking one or more computing devices from a network; removing permissions from one or more user accounts; and/or deleting one or more files. The task object may include a plurality of properties, e.g., a task identifier (e.g., a key); a task name and/or an urgency of performing the task.

The ontology 100 may include an adversaries grouping 130. The adversaries grouping 130 includes objects relating to adversaries responsible for or associated with security incidents. The objects within the adversaries grouping may include an intrusion set object 131, a threat actor object 132, and a campaign object 133.

The intrusion set object 131 represents an intrusion set: a set of adversarial behaviors with common properties thought to be orchestrated by a particular organization. The intrusion set object may include a plurality of properties, e.g., a name for the intrusion set; a date and/or time at which the intrusion set was first seen; a date and/or time that the intrusion set was last seen; a primary motivation of the organization behind the intrusion set; a secondary motivation of the organization behind the intrusion set; a resource level of the organization behind the intrusion set.

The threat actor object 132 represents a threat actor: actual individuals, groups or organizations operating with a malicious intent. The threat actor object 132 may include a plurality of properties, e.g., labels indicating the type of the threat actor; a name of the threat actor; a description of the threat actor; roles which the threat actor plays; goals of the threat actor; the sophistication of the threat actor; primary motivations of the threat actor; secondary motivations of the threat actor; and personal motivations of the threat actor.

The campaign object 133 represents a campaign: a grouping of adversarial behaviors describing a set of malicious activities over a period of time against specific targets. The campaign object 133 may include a plurality of properties, e.g., a name of the campaign; a description of the campaign; a date and/or time the campaign was first seen; a date and/or time the campaign was last seen; and an objective of the campaign.

The ontology 100 may include a tactics, techniques and procedures (TTPs) grouping 140. The TTPs grouping 140 includes objects relating to behavior and resources that attackers use. The objects within the TTPs grouping may include a malware object 141, an attack pattern 142 and a tool object 142.

The malware object 141 represents malware: malicious code and/or software for compromising the confidentiality, integrity and/or availability of a target's operating systems, data or applications. The malware object 141 may include a plurality of properties, e.g., labels describing the type of malware; a name of the malware; a description of the malware; a version of the malware; and/or an identifier (e.g., key) for the malware.

The attack pattern object 142 represents an attack pattern: a method by which an adversary may compromise a target. The attack pattern object 142 may include a plurality of properties, e.g., a name of the attack pattern; a description of the attack pattern; and/or an identifier (e.g., key) for the attack pattern.

The tool object 143 represents a tool: legitimate software used to perform attacks. Examples of tools include remote access tools and network scanning tools. The tool object 143 may include a plurality of properties, e.g., a name of the tool; a description of the tool, a version of the tool; and/or an identifier (e.g., key) for the malware.

The objects in the ontology 100 may be associated with one another using various relationship types as illustrated in FIG. 1. Several relationship types and relationships are described below. However, new relationships may be created and/or the relationships may be renamed. Relationship types other than those described may also be included in the ontology.

A relationship type is the 'contains' relationship. The contains relationship indicates that the entity represented by an object contains the entity represented by the other object. The organization object 113 has contains relationships with one or more group objects 111, one or more user account objects 112, one or more system objects 114, and one or more network zone objects 116. The system object 114 object has a contains relationship with one or more software objects 115 and with one or more network address objects 117. The software object has a contains relationship with one or more vulnerability objects 102. The vulnerability object 102 has a contains relationship with the risk object 101. The assets grouping 110 also has a contains relationship with one or more risk objects.

A relationship type is the 'member' relationship. The member relationship indicates that the entity represented by an object is a member of the entity represented by the other object. The user account object 112 has a member relationship with one or more group objects 111. A group object 111 may also have a member relationship with one or more group objects 111, e.g., a group object may be a member of one or more other group objects.

A relationship type is the 'accesses' relationship. The accesses relationship indicates that an entity represented by an object accesses the entity represented by the other object. The user account object 112 has an accesses relationship with one or more system objects 114.

A relationship type is the 'exists in' relationship. The 'exists in' relationship indicates that an entity represented by an object exists in the entity represented by the other object. The system object 114 and network address object 117 have 'exists in' relationships with one or more network zone objects 116.

A relationship type is the 'exposes' relationship. The 'exposes' relationship indicates that an entity represented by an object exposes the entity represented by another object. The user account object 112 has an exposes relationship with one or more risk objects 101, e.g., a user account exposes one or more risks.

A relationship type is the 'uses' relationship. The 'uses' relationship indicates that an entity represented by an object uses the entity represented by another object. The identity object 103 has a uses relationship with one or more user account objects 112. The adversaries grouping 130, and objects of the object types contained therein, have uses relationships with the TTPs grouping 140, and objects of object types contained therein, e.g., adversaries use TTPs. The attack pattern object 142 has uses relationships with one or more malware objects 141 and with one or more tool objects 143. The malware object 141 has uses relationships with one or more tool objects 143.

A relationship type is the 'indicates' relationship. The 'indicates' relationship indicates that an entity represented by an object indicates a threat is related to an entity represented by another object. The indicator object 104 has indicates relationships with the adversaries grouping 130, and object types contained therein, one or more software objects 115, and one or more network address objects.

A relationship type is the 'detects' relationship. The 'detects' relationship indicates that an entity represented by an object is used to detect the event represented by another object. The indicator object 104 has a detects relationship with the detection events object 122, e.g., indicators are used to detect events. The detection strategy object 121 has a detects relationship with a detection events object 122, e.g., detection strategies are used to detect events.

A relationship type is the 'produces' relationship. The 'produces' relationship indicates that an entity or event represented by an object is used to produce the entity represented by another object. The detection event object 122 has a produces relationship with one or more detection alert objects 123. The risk object 101 has a produces relationship with one or more report objects 108. The incident object 125 has a produces relationship with one or more report objects 108.

A relationship type is the 'managed by' relationship. The 'managed by' relationship indicates that an entity represented by an object is managed by the entity represented by another object. The detection alert object 123 has a 'managed by' relationship with an investigation object 124. The incident object 125 has a 'managed by' relationship with a resolution group object 126.

A relationship type is the 'escalated to' relationship. The 'escalated to' relationship indicates that an entity represented by an object may be 'escalated to', e.g., marked up in importance, to become represented by or transformed into another object. The investigation object 124 has an 'escalated to' relationship with the incident object 125. The resolution group object 126 has an 'escalated to' relationship with the task object 127.

A relationship type is the 'sighting of' relationship. The 'sighting of' relationship indicates that a sighting object 105 represents a sighting of another object. The sighting object 105 has a 'sighting of' relationship with one or more indicator objects 104; one or more observed data objects 106; one or more of the objects in the adversaries grouping 130; and/or one or more of the objects in the TTPs grouping 140.

A relationship type is the 'attributed to' relationship. The 'attributed to' relationship indicates that an entity represented by an object may be attributed to an entity represented by another object. The threat actor object 132 has an 'attributed to' relationship with an identity object 131. The intrusion set object 131 has an 'attributed to' relationship with one or more threat actor objects 132. The campaign object 133 has an 'attributed to' relationship with one or more threat actor objects 132. The campaign object 133 has an 'attributed to' relationship with one or more intrusion set objects 131.

A relationship type is the 'targets' relationship. The 'targets' relationship indicates that an entity represented by an object targets an entity represented by another relationship. Objects of the adversaries grouping 130 have targets relationships with one or more identity objects 103 and one or more vulnerability objects 102. Objects of the TTPs grouping 140 have targets relationships with one or more vulnerability objects 102.

A relationship type is the 'confirms' relationship. The 'confirms' relationship indicates that an entity represented by an object confirms an entity or event represented by another object. The investigation object 124 has a confirms relationship with one or more sighting objects 105, e.g., an investigation may confirm a sighting.

A relationship type is the 'mitigates' relationship. The 'mitigates' relationship indicates that an entity or action represented by an object is usable or performable to mitigate an entity or event represented by another object. The course of action descriptor 107 has a mitigates relationship with one or more vulnerability objects; one or more incident objects 125; and one or more objects of the TTPs grouping 140.

A relationship type is the 'supports' relationship. The 'supports' relationship indicates that an entity represented by an object supports, e.g., provides evidence for, performing one or more action(s) represented by another object. The report object 108 has a supports relationship with the course of action descriptor 107.

Suspicious Event Detection System

Figure 2:
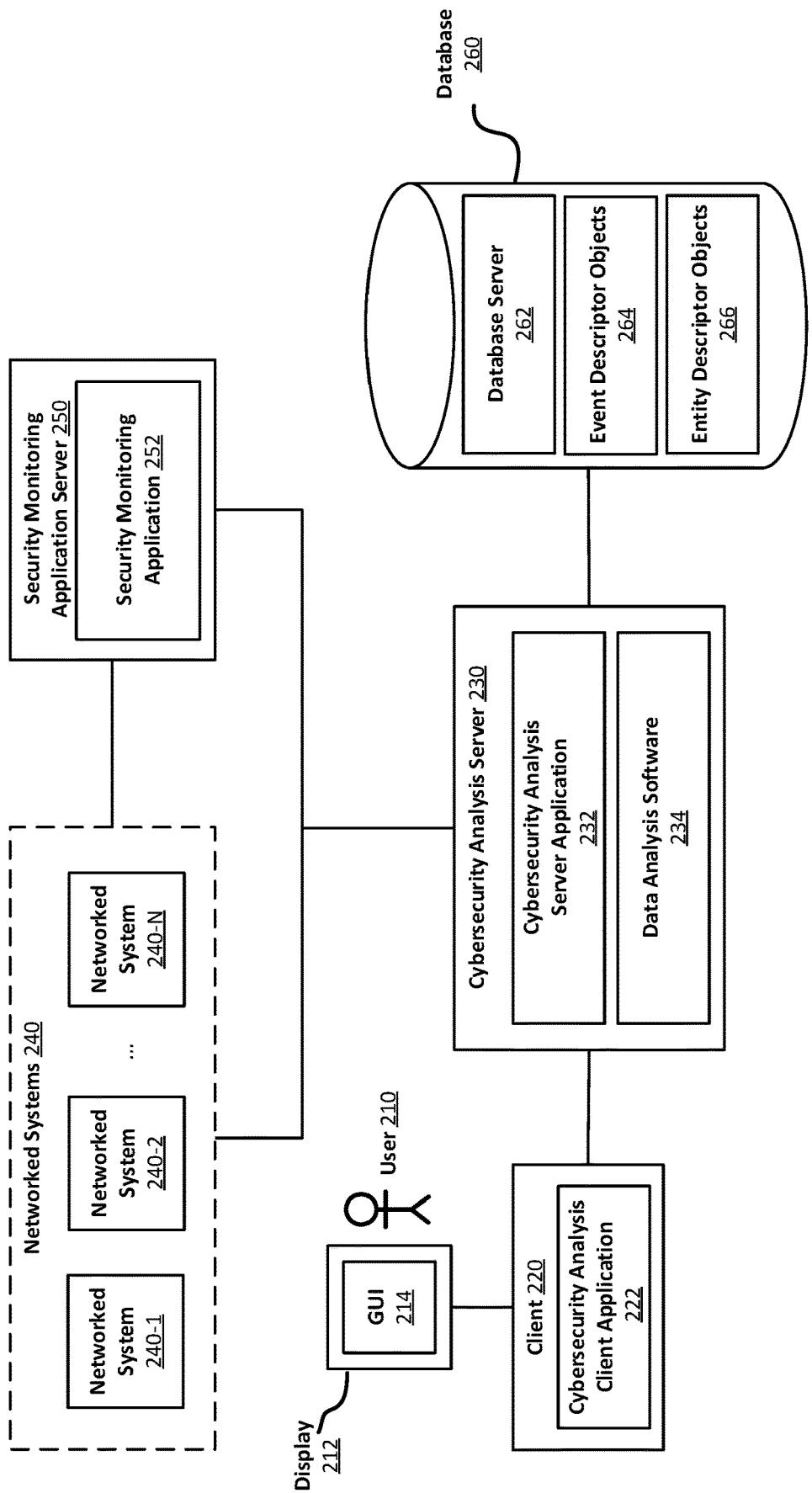
FIG. 2 is a block diagram illustrating an example of a computer system configured to facilitate analysis of cybersecurity threats, in accordance with example embodiments.

FIG. 2 illustrates an example of a computer system configured to facilitate identification and/or analysis of cybersecurity threats, henceforth referred to as cybersecurity analysis system 200. As shown, the cybersecurity analysis system 200 includes a client computing device 220 used by a human user 210, a cybersecurity analysis server 230, one or more networked systems 240, a security monitoring application server 250, and a database 260. These systems and devices may each include some or all of the components discussed below with reference to example computing system 500. The systems and devices may be configured to communicate via one or more networks, such as the Internet, an intranet, a local area network, a wide area network, a wired network, a wireless network, and/or a virtual private network (VPN), for example. For ease of understanding, various components of the system have each been described with reference to one or more computing devices. It should be noted that, in some embodiments, any number of these components may be collocated on the same computing device.

The client computing device 220 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 220 may include one or more of a keyboard, a mouse, a display 214, or a touch screen (of which display 214 may be a part of). For example, the client computing device 220 may be composed of hardware components like those of example computing device 500 described below with respect to FIG. 6.

The client computing device 220 may also include a web browser or a client application configured to display, in a graphical user interface 214 of the display 212, a computer program for cybersecurity analysis. Such a computer program may provide or allow the user to access the functionality of a cybersecurity analysis client application 222. The graphical user interface 214 may be a web browser window, a client application window, an operating system window, an integrated development environment window, a virtual terminal window or other computer graphical user interface window. While only one user 210 and one client computing device 220 are illustrated in FIG. 2, the subject innovations may be implemented in conjunction with one or more users 110 and one or more client computing devices 120.

The client computing device 220 may include the cybersecurity analysis client application 222. The cybersecurity analysis client application 222 may communicate with the cybersecurity analysis server 230. The cybersecurity analysis client application 222 may receive information usable for cybersecurity analysis from the cybersecurity analysis server 230. The cybersecurity analysis client application 222 may cause the received information to be displayed and/or stored, temporarily or persistently, on the client computing device 220. The cybersecurity analysis client application 222 may perform any suitable embodiment of the method 600 described below with respect to FIG. 5.

The cybersecurity analysis server 230 may include one or more processors (e.g., CPUs), a network interface, and memory. The processor(s) is configured to execute computer instructions that are stored in one or more computer-readable media, for example, the memory of the respective server. The cybersecurity analysis server 230 includes a network interface that is configured to allow the server to transmit and receive data in one or more networks, e.g., a network connecting the cybersecurity analysis server 230, the networked systems 140, the security monitoring application server 150 and the database 160. The network interface may include one or more network interface cards (NICs). The memory of the server stores its respective data and instructions.

The cybersecurity monitoring server 230 may include a cybersecurity analysis server application 232. The cybersecurity analysis server application 232 may be implemented as one or more computer programs, or as one or more aspects or components of one or more computer programs. The cybersecurity analysis server application 232 may perform any suitable embodiment of the method 300 described below with respect to FIG. 3 and/or the method 400 described below with respect to FIG. 4. The cybersecurity analysis server 230 may also include data analysis software 234. The data analysis software 234 may be a bespoke computer program, e.g., an enterprise-specific data analysis computer program or a custom script. The data analysis software 234 may alternatively be or additionally include a data analysis software package, e.g., Splunk, Kibana or Tableau.

Each of the one or more networked systems 240 may include one or more processors (e.g., CPUs), a network interface, and memory. The processor(s) is configured to execute computer instructions that are stored in one or more computer-readable media, for example, the memory of the respective networked system. Each of the one or more networked systems 240 includes a network interface that is configured to allow the networked system to transmit and receive data in one or more networks, e.g., a network connecting the networked system with the cybersecurity analysis server 230 and/or with other networked systems. The network interface may include one or more network interface cards (NICs). The memory of each networked system stores its respective data and instructions.

The one or more networked systems 240 may output or include records usable as entity records and/or records usable as event records. The records usable as entity records may include log records, configuration files, and operating system data records, for example. The records usable as event records may include log records; and other event records recorded by the operating systems or applications of the networked systems, for example. These entity and/or event records may be retrieved by, or sent to and received by the cybersecurity analysis server 230.

The one or more networked systems 240 may be a plurality of networked systems 240 in a network of a sizable organization, e.g., an organization having more than 50 systems. Examples of such organizations include enterprises; governments, and departments or organizations thereof, and non-governmental organizations. The one or more networked systems 240 may be networked systems probable to be threatened by malicious actors. These malicious actors may be internal or external malicious actors with permission to access one or more of the networked systems 240. The malicious actors may alternatively or additionally be internal or external malicious actors without access to one or more of the networked systems 240.

A security monitoring application server 250 may include a security monitoring application 252. The security monitoring application 252 may monitor the one or more networked systems 240, or a subset thereof. The security monitoring application 252 may monitor activities occurring on the networked systems 252; provide properties of the networked systems 240; and/or provide information about data on said systems. The security monitoring application 252 may output, or otherwise generate, event records and/or entity records to be received by the cybersecurity analysis server 230. Examples of security monitoring applications include System Center Operations Manager (SCOM); Nagios; and Rudder. The security monitoring application 252 may include a network monitoring application. Examples of network monitoring applications include Zeek, Siricata and Snort. The security monitoring application 252 may include an endpoint monitoring application. Examples of endpoint monitoring applications include Endgame, Carbonblack and CrowdStrike. The security monitoring application 252 may include an advanced threat protection (ATP) application, e.g., Microsoft Office 365 Advanced Threat Protection. The security monitoring application 252 may include an antivirus application, e.g., AVG Antivirus, BitDefender Security, ClamAV, Microsoft Windows Defender and Sophos Anti-Virus.

The database 260 may include a database server module 162 for storing and retrieving data including event descriptor objects 264 and entity descriptor objects 266. The stored event descriptor objects 264 may have the form of or be a representation of the detection events objects 122 described with respect to FIG. 1. The entity descriptor objects 266 may be any number of the other objects described with respect to FIG. 1. The database 260 may be implemented as a single server computing device or as multiple server computing devices arranged in a distributed or clustered computing arrangement. Each such server computing device may be composed of hardware components like those of example computing device 500 described below with respect to FIG. 6.

The database 260 may include one or more processors (e.g., CPUs), a network interface, and memory. The processor(s) may be configured to execute computer instructions that are stored in one or more computer-readable media, for example, the memory of the database 260. The database 260 may include a network interface that is configured to allow the database 260 to transmit and receive data in one or more networks. The network interface may include one or more network interface cards (NICs). The memory of the database 250 may store data or instructions. The instructions stored in the memory may include the database server module 262.

Example Descriptor Object Association Method

Figure 3:
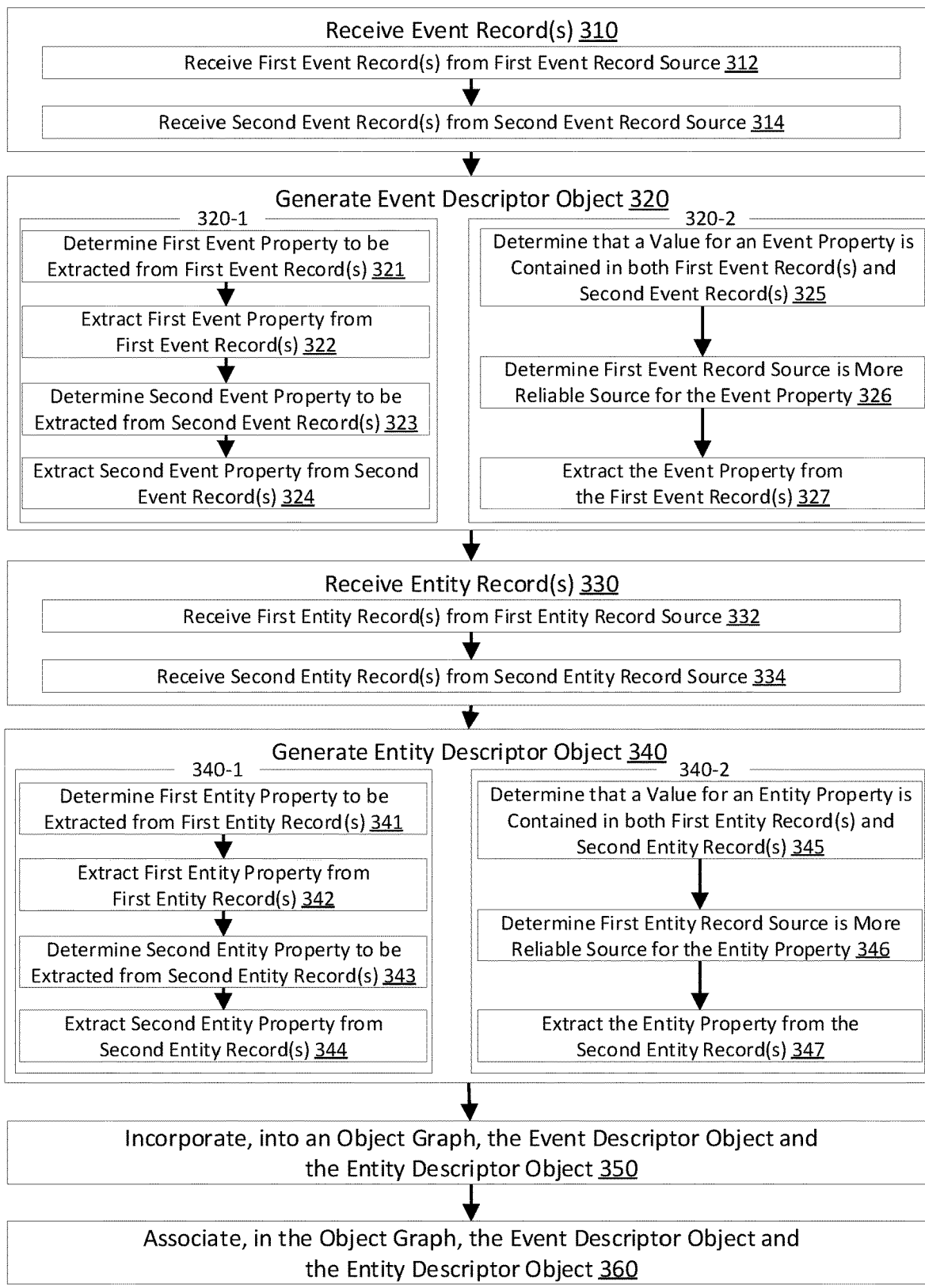
FIG. 3 is a flow diagram illustrating an example method for associating event descriptor objects and entity descriptor objects in an object graph, in accordance with example embodiments.

FIG. 3 is a flowchart illustrating an example method 300 for associating event descriptor objects and entity descriptor objects in an object graph. The method 300 is performed by computer-readable instructions, e.g., software, for execution by one or more processors of one or more computing devices (e.g., the example computing device 500 of FIG. 6). In one embodiment, the one or more computing devices are one or more cybersecurity analysis severs 230. The method 300 may be performed using a cybersecurity analysis software application, e.g., cybersecurity analysis server application 232. The cybersecurity analysis software application, which may be the cybersecurity analysis server application 232, may be any number of and/or any combination of sequences of instructions, interpretable code, loadable modules, dynamic link libraries and/or computer programs. The cybersecurity analysis software application may be implemented on a single computing device or distributed across multiple computing devices.

At block 310, one or more event records are received. The one or more event records may be received from one or more networked systems and/or from one or more security monitoring applications. The event records may include system log records and/or records generated by the one or more security monitoring application.

The event records may be received using any suitable mechanism, e.g., via a remote service call, a representational state transfer (REST) operation, an internal networking protocol; a file sharing protocol or service; and/or memory or persistent storage shared between the software implementing the method 300, and the networked systems and/or the security monitoring application. The event records may be received in any suitable form. For example, the event records may be received as a series of strings, XML formatted data, a JSON object, a file and/or a platform specific markup or binary format.

The system event records may be system log records. Examples of system log records include Windows® event log records and Linux log file records.

Windows® event log records may be stored in one or more of a Windows® Application log, a Windows® Security log, a Windows® Setup log, a Windows® System log, a Windows® Forwarded Events log, and application and/or service specific logs. Windows® event log records may be stored and/or output in the Windows XML event log (EVTX) format, which is a binary XML format, or in a format representing the data contained therein, e.g., the data in a human-readable XML format. Windows® event log records include one or more of the following properties: keywords, user, operational code, log (e.g., log text and/or markup), computer, process ID, thread ID, processor ID, session ID, kernel time, user time, processor time, correlation ID, relative correlation ID, and event source name.

Linux log records may be in a standardized format specified by the Internet Engineering Task Force (IETF) RFC 5424 standard or the IETF RFC 3164 format. Linux log file records may be stored in one or more log files. The one or more log files may be stored in a log directory of a Linux system, e.g., a '/var/log' directory. Examples of log files include: messages, syslog, auth.log, kern.log and cron. Linux log file records include one or more of the following properties: a timestamp, a hostname, an IP address, a facility code, a severity level, a message component, a tag, a version number, an application name, a process identifier, and a message identifier.

Block 310 may include an operation 312 of receiving a first one or more event records from a first event record source and; and an operation 314 of receiving a second one or more event records from a second event record source. The first event record source may be any of the event record sources described above and the second event record source may be any of the other event record sources described above. For instance, the first event record source may be a system log and the second event record source may be a security monitoring application; or the first event record source may be a first security monitoring application and the second event record source may be a second security monitoring application.

At block 320, an event descriptor object is generated using the one or more event records. The generated event descriptor object describes one or more events occurring in the networked system. The one or more events may be suspicious system events indicative of a cybersecurity threat. The generated event descriptor object includes a plurality of event properties descriptive of the event. The object may have the form or have a form similar to that of the detection events object 122 described with respect to FIG. 1. The event descriptor object may be generated by extracting properties from the underlying one or more event records and, if desired, appropriately transforming them.

Where event records are received from multiple event record sources, block 320 may include either or both of a first submethod 320-1 and a second submethod 320-2.

Submethod 320-1 may include: an operation 321 of determining that a first event property of the event properties is to be extracted from a first one or more event records from a first event record source; an operation 322 of extracting the first event property from the first one or more event records; an operation 323 of determining that a second event property of the event properties is to be extracted from a second one or more event records from a second event record source; and an operation 324 of extracting the second event property from the second one or more event records. The first event property may be available in the event records from the first event record source and the second event property may be available in the event records from the second event record source. Extracting the respective properties from records from the respective sources facilitates the generation of event descriptor objects with more properties than those available at a single event record source.

Submethod 320-2 may include: an operation 325 of determining that a value for an event property of the event properties is contained in both a first one or more event records from a first event record source and in a second one or more event records from a second event record source; an operation 326 of determining that the first event record source is a more reliable source for the event property; and an operation 327 of extracting this event property from the first one or more event records. Extracting the property from the more reliable source may facilitate the generation of more reliable event descriptor objects, e.g., event descriptor objects including the most accurate property values available. The more reliable event record source may vary for different event properties, e.g., a security monitoring application may provide more accurate information about malware causing an event and a system log may provide more accurate information about the timeline of the event.

At block 330, one or more entity records are received. The one or more entity records may be received from one or more networked systems and/or from one or more security monitoring applications. The entity records may include system log records, configuration records or files, and/or records generated by the one or more security monitoring application. The entity records may be received using any suitable mechanism, e.g., via a remote service call, a representational state transfer (REST) operation, an internal networking protocol; a file sharing protocol or service; and/or memory or persistent storage shared between the software implementing the method 300, and the networked systems and/or the security monitoring application. The entity records may be received in any suitable form. For example, the entity records may be received as a series of strings, XML formatted data, a JSON object, a file and/or a platform specific markup or binary format.

Block 330 includes an operation 332 of receiving a first one or more entity records from a first entity record source and; and may include an operation 334 of receiving a second one or more entity records from a second entity record source. The first entity record source may be any of the entity record sources described above and the second entity record source may be any of the other entity record sources described above. For instance, the first entity record source may be a system log and the second entity record source may be a security monitoring application; or the first entity record source may be a first security monitoring application and the second entity record source may be a second security monitoring application.

At block 340, an entity descriptor object is generated using the one or more entity records. The generated entity descriptor object is descriptive of one or more entities relevant to the security of the networked system. For example, any of the entities for which objects are present in the cybersecurity ontology 100 described with respect to FIG. 1. The generated event descriptor object includes a plurality of entity properties descriptive of the entity in question. The object may have the form or have a form similar to that of the object for that entity described with respect to FIG. 1. The entity descriptor object may be generated by extracting properties from the underlying one or more entity records and, if desired, appropriately transforming them.

Where event records are received from multiple entity records sources, block 340 may include either or both of a first submethod 340-1 and a second submethod 340-2.

The first submethod 340-1 may include: an operation 341 of determining that a first entity property of the entity properties is to be extracted from a first one or more entity records from a first entity record source; an operation 322 of extracting the first entity property from the first one or more entity records; an operation 323 of determining that a second entity property of the entity properties is to be extracted from a second one or more entity records from a second entity record source; and an operation 324 of extracting the second entity property from the second one or more entity records. The first entity property may be available in the entity records from the first entity record source and the second entity property may be available in the entity records from the second entity record source. Extracting the respective properties from records from the respective sources facilitates the generation of entity descriptor objects with more properties than those available at a single entity record source.

The second submethod 340-2 may include: an operation 345 of determining that a value for an entity property of the entity properties is contained in both a first one or more entity records from a first entity record source and in a second one or more entity records from a second entity record source; an operation 326 of determining that the first entity record source is a more reliable source for the entity property; and an operation 327 of extracting this entity property from the first one or more entity records. Extracting the property from the more reliable source may facilitate the generation of more reliable entity descriptor objects, e.g., entity descriptor objects including the most accurate property values available. The more reliable event record source may vary for different entity properties, e.g., a configuration file may provide more accurate information about a user name and a security monitoring application may provide more accurate information about the times at which that user has been seen.

At block 350, the event descriptor object and the entity descriptor object are incorporated into an object graph. Where the object graph into which the objects are to be incorporated does not exist, the object graph may be created. The object graph may be implemented using any suitable mechanism for representing a graph of related objects, e.g., an object database, a relational or non-relational database overlaid with an object abstraction layer; and/or an in-memory object graph representation.

At block 360, the event descriptor object and the entity descriptor object are associated in the object graph using at least one of the entity properties and one of the event properties. For example, the association may be based on matching a common property of the entity and the event. Where a property for the entity descriptor or the event descriptor has been contained in both of multiple records from multiple sources, the value from the records from the source other than the 'more reliable' source may be used for the matching. For example, the system name may be available in both a configuration file and from a security monitoring application. The entity descriptor object for a system may use the system name from the configuration file as it is considered more reliable. The event descriptor object may be generated using records from the security monitoring application and use the system name contained therein. While the entity descriptor object includes the more reliable system name from the configuration file, it is desirable to associate using the system name from the record source common to both the entity descriptor and object record source, as accurate matching is more likely when a common source is used.

Associating the objects in the graph may include adding a relationship between them in the object graph. The relationship may be a named and/or labelled relationship optionally having properties, e.g., the relationship may be of any of the types described with respect to the ontology 100 of FIG. 1. The relationship may alternatively be a 'plain' association, e.g., a reference between the objects without further information. The relationship may be represented using a relationship object or representation, e.g., the relationship may be explicitly represented. Where the objects have identifiers, the relationships may alternatively be represented by one or both of the objects having properties which include one or more identifiers for the other object, e.g., the event descriptor object may include one or more properties including one or more identifiers for one or more entity descriptor objects.

The method 300 may further include performing blocks 330 and 340 for second entity records to generate a second entity descriptor object for a second entity. The second entity descriptor object may be of a different type than the first entity descriptor, e.g., the first entity descriptor object may be an object of the ontology 100 and the second entity descriptor object may be a different object of the ontology 100. The second entity descriptor object may be incorporated into the object graph in the same way as the event descriptor object and the entity descriptor object. The second entity descriptor object may then be associated with the first entity descriptor object in the object graph in any of the ways previously described.

An entity descriptor object in the object graph, e.g., the first entity descriptor object or the second entity descriptor object, may be a course of action entity descriptor object. The course of action entity descriptor object may be descriptive of one or more actions which may be taken to mitigate the cybersecurity threat indicated by the one or more events represented by the event descriptor object. The course of action entity descriptor object may take the form of or a form similar to the course of action descriptor 107 described with respect to FIG. 1. A path may exist in the object graph between the event descriptor object and the course of action entity descriptor object. A path may describe there being a series of relationships in the object graph by which the graph may be traversed to reach the course of action entity descriptor object from the event descriptor object.

The method 300 may further include analyzing at least part of the object graph using one or more data analysis software components. The data analysis software components may be the data analysis software 234 described with respect to FIG. 2. The analysis may include deriving one or more cybersecurity indicator for the one or more entities represented by the entity descriptor object, e.g., an indicator that the device represented by the object is a compromised device or the user represented by the object is a malicious. Deriving the cybersecurity indicator may use the association between the event descriptor object and the entity descriptor object. For example, the event descriptor object may represent a suspicious system event and may be associated with a system entity descriptor object. Using this association the data analysis software may determine that the device represented by the system entity descriptor object is compromised. In another example, the cybersecurity indicator may represent a suspicious system event and may be (directly or indirectly) associated with a vulnerability entity descriptor objector. Using this association the data analysis software may determine that this vulnerability is a cause of the suspicious system event. Further results may be derived from this, e.g., cybersecurity indicators indicating all systems having the software containing this vulnerability may be located.

Example Descriptor Object Provision Method

Figure 4:
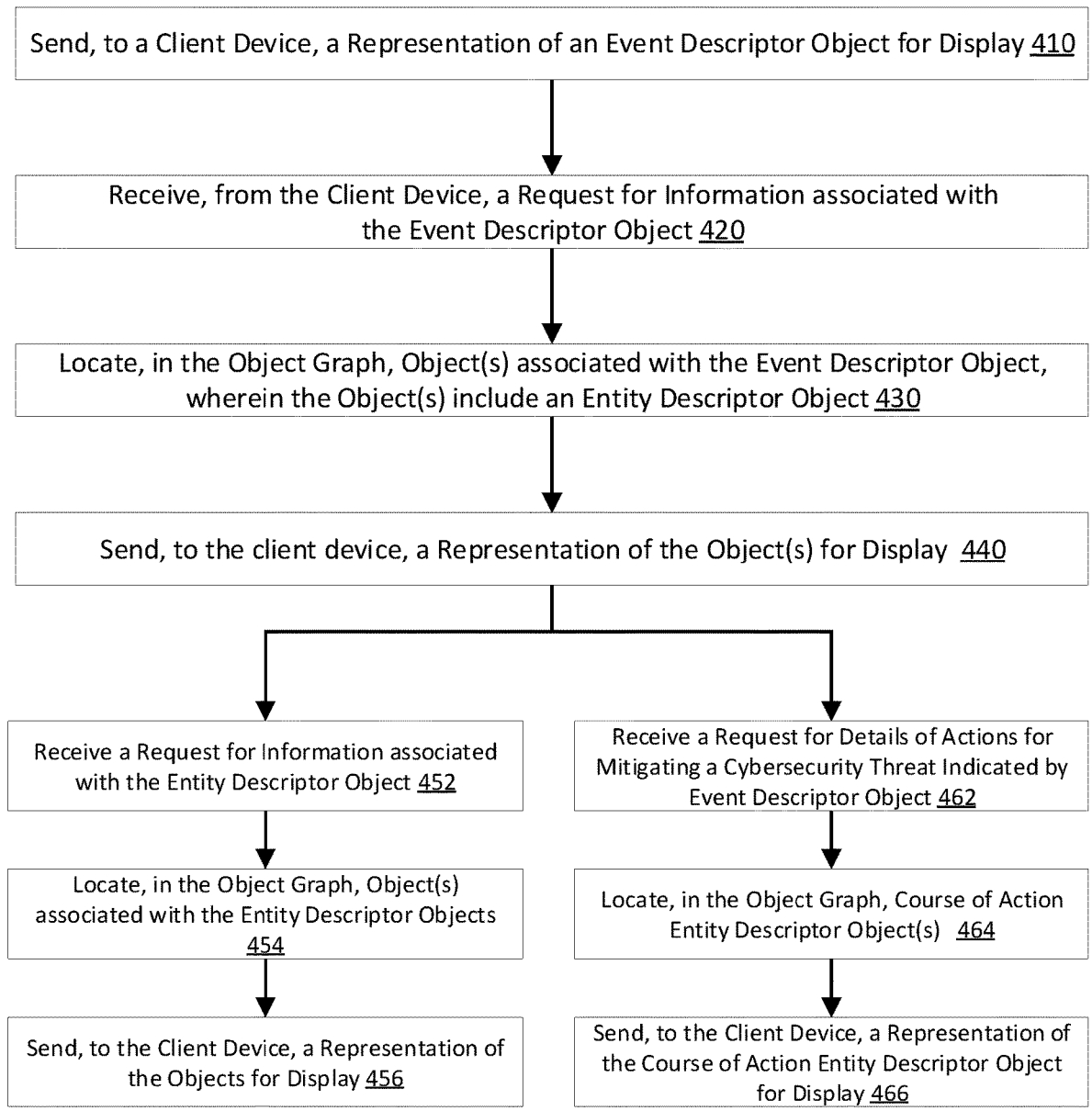
FIG. 4 is a flow diagram illustrating an example method for providing event descriptor objects and associated entity descriptor objects to a client device, in accordance with example embodiments.

FIG. 4 is a flowchart illustrating an example method 400 for providing event descriptor objects and associated entity descriptor objects to a client device. The method 400 is performed by computer-readable instructions, e.g., software, for execution by one or more processors of one or more computing devices (e.g., the example computing device 500 of FIG. 6). In one embodiment, the one or more computing devices are one or more cybersecurity analysis severs 230. The method 400 may be performed using a cybersecurity analysis software application, e.g., cybersecurity analysis server application 232. The cybersecurity analysis software application may be any number of and/or any combination of sequences of instructions, interpretable code, loadable modules, dynamic link libraries and/or computer programs. The cybersecurity analysis software application may be implemented on a single computing device or distributed across multiple computing devices.

At block 410, a representation of an event descriptor object is sent to a client device for display. The event descriptor object includes a plurality of event properties descriptive of the event. The object may have the form or have a form similar to that of the detection events object 122 described with respect to FIG. 1. The representation of the event descriptor object may be the event descriptor object itself or a transformation of the event descriptor object adapted for transmission to, display by and/or retrieval by the client device. The representation of the event descriptor object includes the plurality of event properties.

One or more further representations of event descriptor objects may be sent to the client device. The one or more further event descriptor objects may be representative of another one or more events occurring at the same or similar times to the event. These one or more further representations of event descriptor objects may be sent to facilitate chronological analysis of events.

The representation of the event descriptor object may be sent using any suitable mechanism, e.g., via a remote service call, a representational state transfer (REST) operation, an internal networking protocol; and/or memory or persistent storage shared between the software implementing the method 400 and the client device. The representation of the event descriptor object may be sent in any suitable form. For example, the representation of the event descriptor object may be sent as a series of strings, XML formatted data, a JSON object, a file and/or a platform specific markup or binary format.

At block 420, a request for information associated with the event descriptor object is received from the client device. The request may be an indication that a user of the client device and/or an application running on the client device desires information about entities relating to the event descriptor object. The request may have been caused by a user input to the client device, e.g., a user double clicking on a user interface displaying the representation of the event descriptor object.

The request for information may be received using any suitable mechanism, e.g., via a remote service call, a representational state transfer (REST) operation, an internal networking protocol; a file sharing protocol or service; and/or memory or persistent storage shared between the software implementing the method 400 and the client device.

At block 430, objects associated with the event descriptor object may be located in the object graph. The objects associated with the event descriptor object may be located by retrieving and/or otherwise locating in the object graph objects which have a relationship with and/or are otherwise associated with the event descriptor object. The associated objects may include one or more entity descriptor objects. The entity descriptor objects may be of any of the forms previously described, e.g., of any of the entity object types described with respect to the ontology 100 of FIG. 1.

At block 440, a representation the one or more objects is sent to the client device for display. The representation of the one or more objects may be the one or more objects themselves or a transformation of the one or more objects adapted for transmission to, display by and/or retrieval by the client device. The representation of the one or more objects may be sent using any suitable mechanism, e.g., via a remote service call, a representational state transfer (REST) operation, an internal networking protocol; and/or memory or persistent storage shared between the software implementing the method 400 and the client device. The representation of the one or more objects may be sent in any suitable form. For example, the representation of the one or more objects may be sent as a series of strings, XML formatted data, a JSON object, a file and/or a platform specific markup or binary format.

At block 452, a request for information associated with the entity descriptor object is received from the client device. The request may be an indication that a user of the client device and/or an application running on the client device desires information about entities relating to the entity descriptor object. The request may have been caused by a user input to the client device, e.g., a user double clicking on a user interface displaying the representation of the entity descriptor object.

The request for information may be received using any suitable mechanism, e.g., via a remote service call, a representational state transfer (REST) operation, an internal networking protocol; a file sharing protocol or service; and/or memory or persistent storage shared between the software implementing the method 400 and the client device.

At block 454, objects associated with the entity descriptor object may be located in the object graph. The objects associated with the entity descriptor object may be located by retrieving, and/or otherwise locating in the object graph, objects which have a relationship with and/or are otherwise associated with the entity descriptor object. The associated objects may include one or more other entity descriptor objects. The one or more other entity descriptor objects may be of any of the forms previously described, e.g., of any of the entity object types described with respect to the ontology 100 of FIG. 1.

At block 456, a representation the one or more objects associated with the entity descriptor is sent to the client device for display. The representation of the one or more objects may be the one or more objects themselves itself or a transformation of the one or more objects adapted for transmission to, display by and/or retrieval by the client device. The representation of the one or more objects may be sent using any suitable mechanism, e.g., via a remote service call, a representational state transfer (REST) operation, an internal networking protocol; and/or memory or persistent storage shared between the software implementing the method 400 and the client device. The representation of the one or more objects may be sent in any suitable form. For example, the representation of the one or more objects may be sent as a series of strings, XML formatted data, a JSON object, a file and/or a platform specific markup or binary format.

At block 462, a request for details of one or more actions for mitigating a cybersecurity threat indicated by the event descriptor object may be received. The request may be an indication that a user of the client device and/or an application running on the client device desires details of one or more actions which may be taken to remediate or mitigate the indicated threat. The request may have been caused by a user input to the client device, e.g., a user double clicking on a user interface displaying the representation of the entity descriptor object.

The request for details of one or more actions for mitigating a cybersecurity threat may be received using any suitable mechanism, e.g., via a remote service call, a representational state transfer (REST) operation, an internal networking protocol; a file sharing protocol or service; and/or memory or persistent storage shared between the software implementing the method 400 and the client device.

At block 464, one or more course of action entity descriptor objects descriptive of one or more actions for mitigating the cybersecurity threat may be located. The object graph includes a path between the event descriptor object and the course of action entity descriptor object. The appropriate one or more course of action entity descriptor objects may be located by traversing relationships in the object graph from the event descriptor to the one or more course of action entity descriptor objects.

At block 466, a representation of the one or more course of action entity descriptor objects is sent to the client device for display. The representation of the one or more objects may be the one or more course of action entity descriptor objects themselves or a transformation of the one or more objects adapted for transmission to, display by and/or retrieval by the client device. The representation of the one or more course of action entity descriptor objects may be sent using any suitable mechanism, e.g., via a remote service call, a representational state transfer (REST) operation, an internal networking protocol; and/or memory or persistent storage shared between the software implementing the method 400 and the client device. The representation of the one or more course of action entity descriptor objects may be sent in any suitable form. For example, the representation of the one or more course of action entity descriptor objects may be sent as a series of strings, XML formatted data, a JSON object, a file and/or a platform specific markup or binary format.

Example Descriptor Object Display Method

Figure 5:
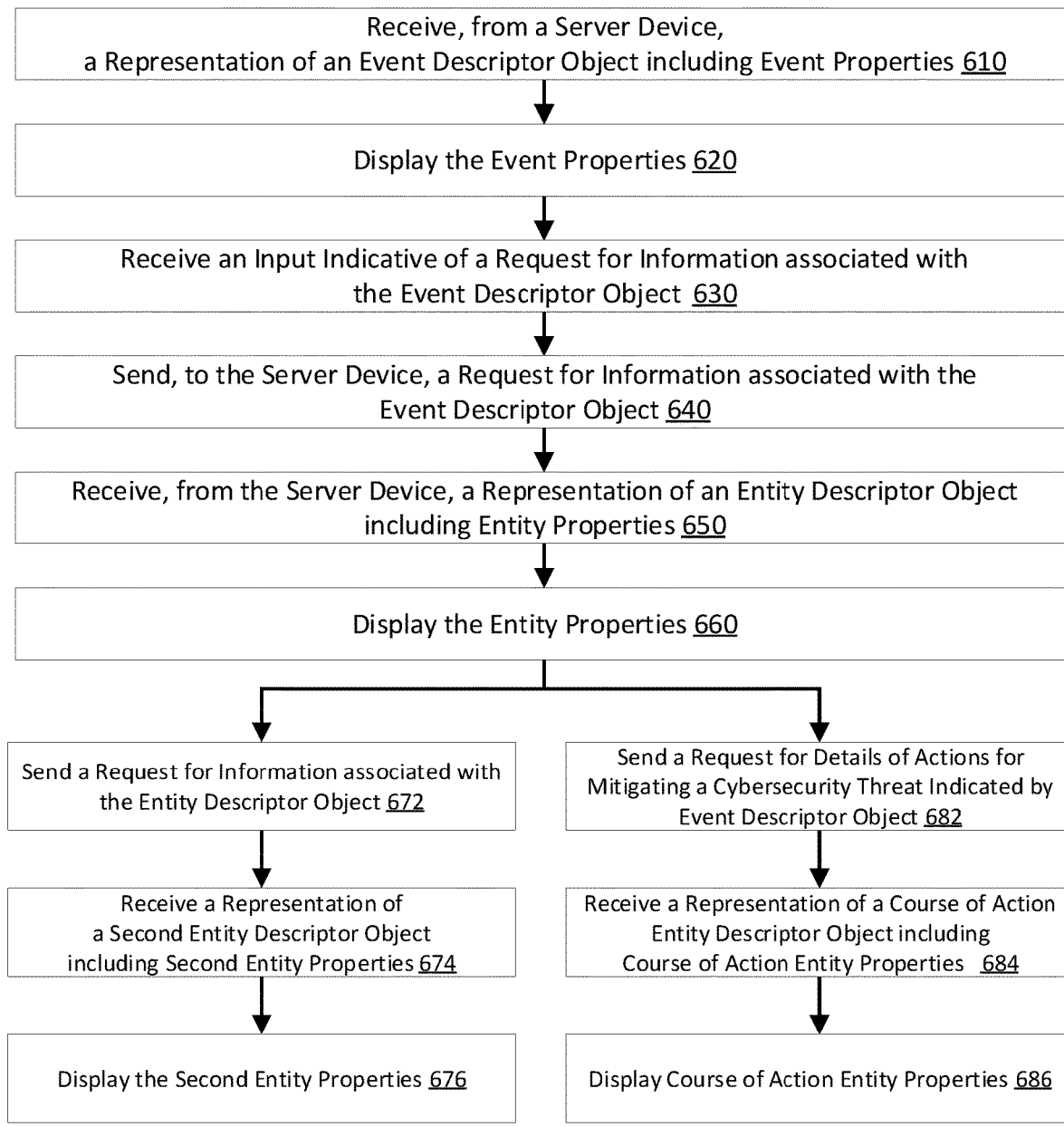
FIG. 5 is a flow diagram illustrating an example method for displaying event properties of event descriptor objects and entity properties of associated entity descriptor objects, in accordance with example embodiments.

FIG. 5 is a flowchart illustrating an example method 600 for displaying event properties of event descriptor objects and entity properties of associated entity descriptor objects. The method 600 is performed by computer-readable instructions, e.g., software, for execution by one or more processors of one or more computing devices (e.g., the example computing device 500 of FIG. 6). In some embodiments, the one or more computing devices are one or more clients 220 of a cybersecurity analysis system 200. The method 600 may be performed using a cybersecurity analysis software application, e.g., cybersecurity analysis client application 222. The cybersecurity analysis software application may be any number of and/or any combination of sequences of instructions, interpretable code, loadable modules, dynamic link libraries and/or computer programs. The cybersecurity analysis software application may be implemented on a single computing device or distributed across multiple computing devices.

At block 610, a representation of an event descriptor object is received from a server device. The event descriptor object is descriptive of one or more events occurring in a networked system. The representation of the event descriptor object includes a plurality of event properties. The event descriptor object represented may have the form or have a form similar to that of the detection events object 122 described with respect to FIG. 1. The representation of the event descriptor object may be the event descriptor object itself or a transformation of the event descriptor object adapted for transmission to, display by and/or retrieval by the device implementing the method 600.

The representation of the event descriptor object may be received using any suitable mechanism, e.g., via a remote service call, a representational state transfer (REST) operation, an internal networking protocol; and/or memory or persistent storage shared between the server device and the software implementing the method 600. The representation of the event descriptor object may be received in any suitable form. For example, the representation of the event descriptor object may be received as a series of strings, XML formatted data, a JSON object, a file and/or a platform specific markup or binary format.

One or more further representations of event descriptor objects may be received from the server device. The one or more further event descriptor objects may be representative of another one or more events occurring at the same or similar times to the event, and each may contain a plurality of event properties of the respective event.

At block 620, the plurality of event properties are displayed. The plurality of event properties may be displayed on a display as part of the graphical user interface ("GUI") which may take any of the forms described. The plurality of event properties may be displayed on the display simultaneously or using user interface elements whereby a user provides inputs to access one or more of the plurality of properties. For example, the user may scroll down or scroll across to access one or more of the plurality of event properties and/or may click a user interface element, e.g., an expand button, to access one or more of the plurality of event properties. The plurality of event properties may be displayed in a format corresponding to and/or based on the structure of the representation of the event descriptor object.

Where one or more further representations of event descriptor objects are received from the server device, the plurality of event properties included in each of these representations may be displayed for each of these further representations. The event properties of the one or more further representations in an order corresponding to the times of the associated event, e.g., may be displayed chronologically or reverse chronologically.

At block 630, an input indicative of a request for information associated with the event descriptor object is received. The input may be any suitable input to the device implementing the method 600, e.g., a keyboard input, a mouse input, or a touch input. The received input may be associated with the event properties, e.g., the received input may be a double click on a user interface element including the event properties or the received input may be a keyboard input occurring when the user interface element is selected.

At block 640, a request for information associated with the event descriptor object is sent to the server device. The request may indicate to the server that a user of and/or an application running on device implementing the method 600 desires information about entities relating to the event descriptor object. The request may be in response to the received input.

The request for information may be sent using any suitable mechanism, e.g., via a remote service call, a representational state transfer (REST) operation, an internal networking protocol; a file sharing protocol or service; and/or memory or persistent storage shared between the software implementing the method 600 and server device.

At block 650, a representation of an entity descriptor object descriptive of one or more entities relevant to the security of the networked system is received. The representation of the entity descriptor object includes a plurality of entity properties. The entity descriptor object is associated with the event descriptor object in an object graph at the server device. The entity descriptor object represented may have the form or have a form similar to that of any of the entity objects described with respect to FIG. 1. The representation of the entity descriptor object may be the entity descriptor object itself or a transformation of the entity descriptor object adapted for transmission to, display by and/or retrieval by the device implementing the method 600.

The representation of the event descriptor object may be received using any suitable mechanism, e.g., via a remote service call, a representational state transfer (REST) operation, an internal networking protocol; and/or memory or persistent storage shared between the server device and the software implementing the method 600. The representation of the event descriptor object may be received in any suitable form. For example, the representation of the event descriptor object may be received as a series of strings, XML formatted data, a JSON object, a file and/or a platform specific markup or binary format.

At block 660, the plurality of entity properties are displayed. The plurality of entity properties may be displayed on a display as part of the GUI which may take any of the forms described. The plurality of entity properties may be displayed on the display simultaneously or using user interface elements whereby a user provides inputs to access one or more of the plurality of entity properties. For example, the user may scroll down or scroll across to access one or more of the plurality of entity properties and/or may click a user interface element, e.g., an expand button, to access one or more of the plurality of event properties. The plurality of entity properties may be displayed in a format corresponding to and/or based on the structure of the representation of the entity descriptor object.

At block 672, a request for information associated with the entity descriptor object is sent to the server device. The request may indicate to the server that a user of and/or an application running on device implementing the method 600 desires information about entities relating to the entity descriptor object. The request may be in response to an input received at the device, e.g., a double click on a user interface element including the entity properties of the entity descriptor object. Alternatively, the request may be triggered automatically, e.g., further objects may be automatically received if sufficient computational resources and/or network capacity are available.

The request for information may be sent using any suitable mechanism, e.g., via a remote service call, a representational state transfer (REST) operation, an internal networking protocol; a file sharing protocol or service; and/or memory or persistent storage shared between the software implementing the method 600 and server device.

At block 674, a representation of a second entity descriptor object descriptive of a second one or more entities relevant to the security of the networked system is received. The representation of the second one or more entity descriptor object includes a plurality of second entity properties. The second entity descriptor object is associated with the entity descriptor object in an object graph at the server device. The second entity descriptor object represented may have the form or have a form similar to that of any of the entity objects described with respect to FIG. 1. The representation of the second entity descriptor object may be the second entity descriptor object itself or a transformation of the second entity descriptor object adapted for transmission to, display by and/or retrieval by the device implementing the method 600.

The representation of the second entity descriptor object may be received using any suitable mechanism, e.g., via a remote service call, a representational state transfer (REST) operation, an internal networking protocol; and/or memory or persistent storage shared between the server device and the software implementing the method 600. The representation of the second entity descriptor object may be received in any suitable form. For example, the representation of the second entity descriptor object may be received as a series of strings, XML formatted data, a JSON object, a file and/or a platform specific markup or binary format.

At block 676, the plurality of second entity properties are displayed. The plurality of second entity properties may be displayed on a display as part of the GUI which may take any of the forms described. The plurality of second entity properties may be displayed on the display simultaneously or using user interface elements whereby a user provides inputs to access one or more of the plurality of second entity properties. For example, the user may scroll down or scroll across to access one or more of the plurality of second entity properties and/or may click a user interface element, e.g., an expand button, to access one or more of the plurality of event properties. The plurality of second entity properties may be displayed in a format corresponding to and/or based on the structure of the representation of the second entity descriptor object.

At block 682, a request for details of one or more actions for mitigating a cybersecurity threat indicated by the event descriptor object is sent to the server device. The request may be an indication that a user of and/or an application running on the device implementing the method 600 desires details of one or more actions which may be taken to remediate or mitigate the indicated threat. The request may be in response to an input received, e.g., a double click on a user interface element to request details of a course of action to remedy the indicated cybersecurity threat.

The request for details of one or more actions for mitigating a cybersecurity threat may be sent using any suitable mechanism, e.g., via a remote service call, a representational state transfer (REST) operation, an internal networking protocol; a file sharing protocol or service; and/or memory or persistent storage shared between the software implementing the method 600 and the server device.

At block 684, a representation of a course of action entity descriptor object is received. The representation of the one or more course of action entity descriptor objects includes a plurality of course of action entity properties. The representation of the course of action entity descriptor object may be the course of action entity descriptor object itself or a transformation of the object adapted for transmission to, display by and/or retrieval by the device implementing the method 600. The object graph at the server device includes a path between the course of action entity descriptor object and the event descriptor object. A path may describe there being a series of relationships in the object graph by which the graph may be traversed to reach the course of action entity descriptor object from the event descriptor object.

The representation of the course of action entity descriptor object may be received using any suitable mechanism, e.g., via a remote service call, a representational state transfer (REST) operation, an internal networking protocol; and/or memory or persistent storage shared between the software implementing the method 600 and the server device. The representation of the course of action entity descriptor object may be received in any suitable form. For example, the representation of the course of action entity descriptor object may be received as a series of strings, XML formatted data, a JSON object, a file and/or a platform specific markup or binary format.

At block 686, the plurality of course of action entity properties are displayed. The plurality of course of action entity properties may be displayed on a display as part of the GUI which may take any of the forms described. The plurality of course of action entity properties may be displayed on the display simultaneously or using user interface elements whereby a user provides inputs to access one or more of the plurality of course of action entity properties. For example, the user may scroll down or scroll across to access one or more of the plurality of course of action properties and/or may click a user interface element, e.g., an expand button, to access one or more of the plurality of event properties. The plurality of course of action entity properties may be displayed in a format corresponding to and/or based on the structure of the representation of the course of action entity descriptor object.

Example Computing Device

Figure 6:
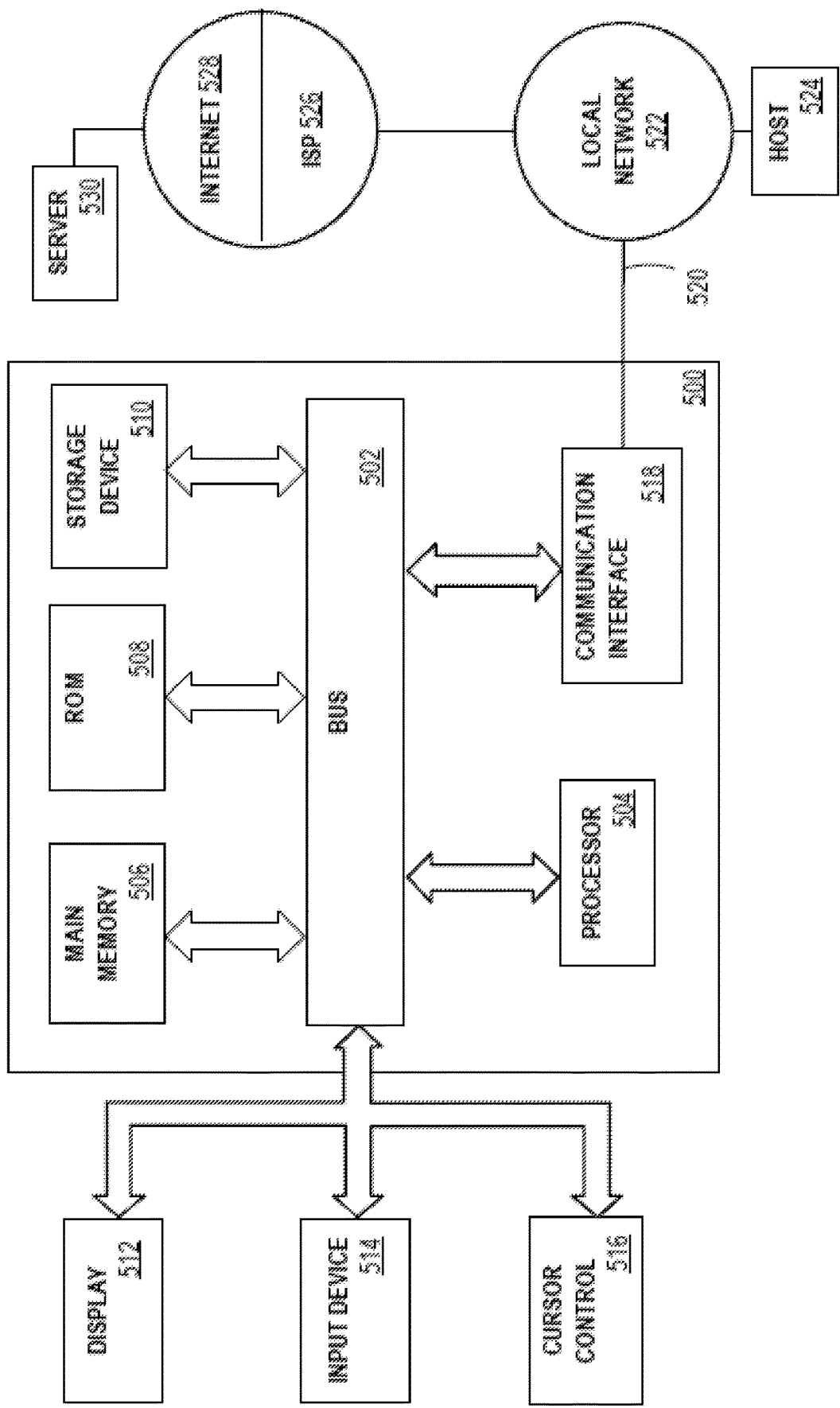
FIG. 6 is a schematic diagram of a computing device in which software-implemented processes of the example embodiments may be embodied.

Referring now to FIG. 6, it is a block diagram that illustrates an example computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

The above-described example computer hardware is presented for purpose of illustrating the underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Graphical User Interface

Figure 7:
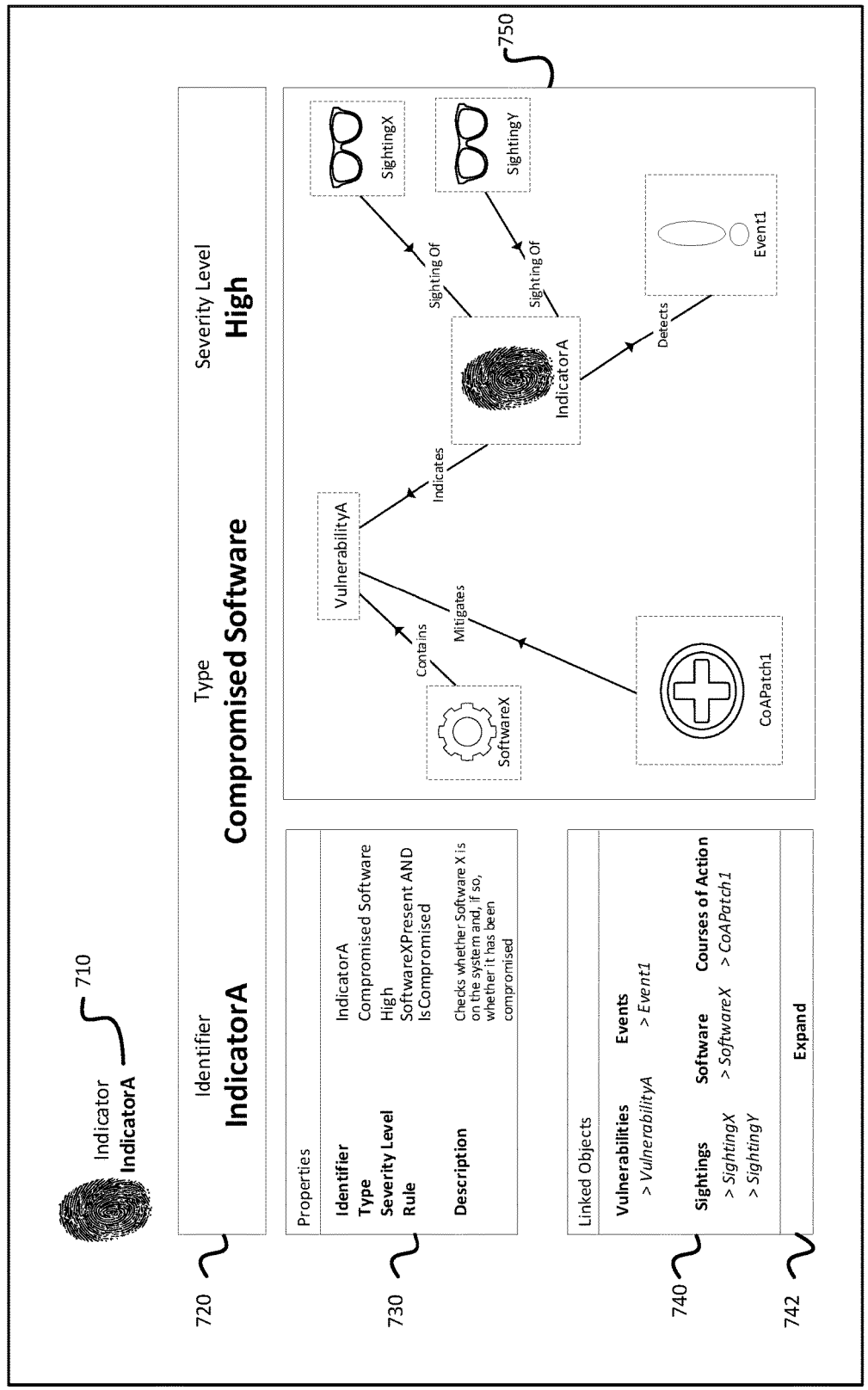
FIG. 7 is representative drawing, illustrating an example instance of a graphical user interface for a cybersecurity analysis client application.

FIG. 7 illustrates an example graphical user interface (GUI) 700 for a cybersecurity analysis client application, e.g., cybersecurity analysis client application 222. The GUI 700 may display a plurality of properties associated with the cybersecurity of one or more networked systems. The plurality of properties may include any of the properties referenced above, e.g., event descriptor properties and/or entity descriptor properties. The GUI 700 may include representations of one or more event descriptor objects and/or entity descriptor objects The shown GUI 700 relates to an indicator, e.g., an indicator of compromise, and illustrates properties of the indicator and a number of objects associated with the indicator. The illustrated properties of the system may be properties of an indicator object. While the shown GUI 700 relates to an indicator, it should be appreciated that similar graphical user interfaces relating to other entities and/or events may also be presented by a cybersecurity analysis client application, e.g., cybersecurity analysis client application 222.

The GUI 700 may include a header element 710. The header element 710 may include an icon indicating the type of entity or event to which the interface relates, a name of the type of entity or event and an identifier of the entity. For example, the shown header element 710 shows a fingerprint icon to indicate the interface relates to an indicator, the entity type name 'Indicator', and the identifier of the indicator to which the GUI relates 'IndicatorA'.

The GUI 700 may also include a summary bar 720 showing several important properties of the entity. By including the several important properties in the summary bar, the visibility of the several important properties may be enhanced. The shown summary bar 720 shows several important properties of the indicator 'IndicatorA'. The several important properties in the shown summary bar 720 are the identifier of the indicator, the type of the indicator and a severity level for the indicator.

The GUI 700 may also include a properties interface element 730. The properties interface element may show several properties of the entity. The several properties of the entity may include the several important properties of the entity and one or more other properties of the entity. In the shown properties interface element 730, the several important properties of the indicator 'IndicatorA' are shown and, in addition, a 'Rule' property, representing a rule used to detect suspicious system events, and a description property containing a textual description of the indicator.

The graphical user interface 700 may include a linked objects interface element 740. The linked objects interface element 740 may list the names of objects associated with the entity. By clicking on the names of the objects, further properties of the objects may be shown and/or a user interface showing properties of the object may be displayed. The shown linked objects interface element 740 shows vulnerability objects, event descriptor objects, software objects, course of action descriptors and sighting objects which relate to the indicator 'IndicatorA'.

The linked objects interface element 740 may include an expand button 742. By interacting with the expand button 742, further objects associated with the entity may be displayed. For example, the user may click on the expand button 742 to show more objects associated with the indicator 'IndicatorA'.

The graphical user interface 700 may include an object graph interface element 750. The object graph interface element 750 may show an object graph indicating relationships between one or more objects associated with the entity. For example, the object graph interface element 750 shows several objects associated with the indicator 'IndicatorA'. The object graph interface element 750 includes vulnerability descriptor objects, event descriptor objects, software descriptor objects, course of action descriptor objects and sighting descriptor objects. The indicator has an indicates relationship with a vulnerability object 'VulnerabilityA'. A software object 'Software X' has a contains relationship with the vulnerability object 'VulnerabilityA'. A course of action descriptor 'CoAPatch1' has a mitigates relationship with the vulnerability object 'VulnerabilityA'. Sighting objects 'SightingX' and 'SightingY' have 'sighting of' relationships with indicator 'IndicatorA'. The indicator 'IndicatorA' has a detects relationship with event descriptor object 'Event1', e.g., the rule contained in the indicator 'IndicatorA' has been used to detect the suspicious system event represented by event descriptor object 'Event1'.

Extensions and Alternatives

It is understood that any specific order or hierarchy of blocks in the methods disclosed are an illustration of example approaches. Based upon design preferences, it is understood that the specific order or hierarchy of blocks in the methods may be rearranged, or that all illustrated blocks be performed. Some of the blocks may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A method, performed by one or more processors, comprising:
   receiving one or more event records;
   generating, using the one or more event records, an event descriptor object descriptive of one or more potential suspicious system events indicative of a cybersecurity threat occurring in a networked system, wherein the event descriptor object comprises a plurality of event properties;
   receiving one or more entity records;
   generating, using the one or more entity records, an entity descriptor object descriptive of one or more entities relevant to a security of the networked system, wherein the entity descriptor object comprises a plurality of entity properties;
   incorporating, into an object graph, the event descriptor object as a first node and the entity descriptor object as a second node;
   in response to determining that a value of an entity property of the plurality of entity properties matches a value of an event property of the plurality of event properties, associating, in the object graph, the event descriptor object with the entity descriptor object; and determining a course of action entity descriptor object descriptive of one or more actions for mitigating the cybersecurity threat, wherein the object graph comprises a link between the event descriptor object and the course of action entity descriptor object.

2. The method of claim 1, wherein receiving the one or more entity records comprises:

receiving a first one or more entity records from a first entity record source; and receiving a second one or more entity records from a second entity record source.

3. The method of claim 2, wherein the first entity record source is a system log and the second entity record source is a security monitoring application.

4. The method of claim 2, wherein generating the entity descriptor object comprises:

determining that a first entity property of the plurality of entity properties is to be extracted from the first one or more entity records;

extracting the first entity property from the first one or more entity records;

determining that a second entity property of the plurality of entity properties is to be extracted from the second one or more entity records; and extracting the second entity property from the second one or more entity re cords.

5. The method of claim 2, wherein generating the entity descriptor object comprises:

determining that a value for an entity property of the plurality of entity properties is contained in both the first one or more entity records and the second one or more entity records;

determining that the first entity record source is a more reliable entity record source for the event property; and extracting the entity property from the first one or more entity records.

6. The method of claim 1, wherein associating the entity descriptor object with the event descriptor object uses the value for the entity property contained in the second one or more entity records.

7. The method of claim 1, further comprising:

receiving one or more second entity records;

generating, using the one or more second entity records, a second entity descriptor object descriptive of a second one or more entities relevant to the security of the networked system, wherein the second entity descriptor object comprises a plurality of second entity properties;

incorporating, into the object graph, the second entity descriptor object; and associating, in the object graph, the second entity descriptor object with the entity descriptor object using at least one of the plurality of second entity properties and at least one of the plurality of entity properties.

8. The method of claim 1, further comprising:

analyzing, using one or more data analysis software components, at least part of the object graph, wherein analyzing the at least part of the object graph comprises deriving one or more cybersecurity indicators for the one or more entities using the association between the event descriptor object and the entity descriptor object.

9. The method of claim 1, further comprising:

sending, to a client device, a representation of the event descriptor object for display;

receiving, from the client device, a request for information associated with the event descriptor object;

in response to the request, locating, in the object graph, one or more objects associated with the event descriptor object, wherein the one or more objects comprise the entity descriptor object; and sending, to the client device, a representation of the one or more objects for display.

10. The method of claim 9, further comprising:

receiving, from the client device, a second requestor information associated with the entity descriptor object;

in response to the second request, locating, in the object graph, a second one or more objects associated with the entity descriptor object, wherein the second one or more objects comprise another entity descriptor object; and sending, to the client device, a representation of the second one or more objects for display.

11. The method of claim 9, further comprising:

receiving, from the client device, a request for details of the one or more actions for mitigating a cybersecurity threat indicated by the event descriptor object;

in response to the request, locating, in the object graph, one or more course of action entity descriptor objects descriptive of the one or more actions for mitigating the cybersecurity threat, wherein the object graph comprises a path between the event descriptor object and the course of action entity descriptor object; and sending, to the client device, a representation of the course of action entity descriptor objector display.

12. The method of claim 10, wherein the second request for information associated with the entity descriptor object is a request for details of actions for mitigating a cybersecurity threat indicated by the event descriptor object.

13. The method of claim 1, wherein the one or more event records and the one or more entity records are preexisting records.

14. A method, performed by one or more processors, comprising:

receiving, from a server device, a representation of an event descriptor object descriptive of one or more potential suspicious system events indicative of a cybersecurity threat occurring in a networked system, wherein the representation of the event descriptor object comprises a plurality of event properties;

displaying the plurality of event properties;

receiving an input indicative of a request for information associated with the event descriptor object;

sending, to the server device, the request for information associated with the event descriptor object; and receiving, from the server device, a representation of an entity descriptor object descriptive of one or more entities relevant to a security of the networked system wherein:

the representation of the entity descriptor object comprises a plurality of entity properties;

in response to determining that a value of an entity property of the plurality of entity properties matches a value of an event property of the plurality of event properties, the entity descriptor object as a first node is associated with the event descriptor object as a second node in an object graph at the server device;

determining a course of action entity descriptor object descriptive of one or more actions for mitigating the cybersecurity threat, wherein the object graph comprises a link between the event descriptor object and the course of action entity descriptor object; and displaying the plurality of entity properties.

15. The method of claim 14, further comprising:

sending, to the server device, a request for information associated with the entity descriptor object;

receiving, from the server device, a representation of a second entity descriptor object descriptive of a second one or more entities relevant to the security of the networked system, wherein:

the representation of the second entity descriptor object comprises a plurality of second entity properties; and the second entity descriptor object is associated with the entity descriptor object in the object graph at the server device; and displaying the plurality of second entity properties.

16. The method of claim 14, further comprising:

sending, to the server device, a request for details of the one or more actions for mitigating a cybersecurity threat indicated by the event descriptor object;

receiving, from the server device, a representation of a course of action entity descriptor object descriptive of the one or more actions for mitigating the cybersecurity threat, wherein:

the representation of the course of action entity descriptor object comprises a plurality of course of action entity properties; and the object graph at the server device comprises a path between the event descriptor object and the course of action entity descriptor object; and displaying the plurality of course of action entity properties.

17. A computer program, stored on a non-transitory computer readable medium, which, when executed by one or more processors of a data processing apparatus causes the data processing apparatus to perform operations comprising:

receiving one or more event records;

generating, using the one or more event records, an event descriptor object descriptive of one or more potential suspicious system events indicative of a cybersecurity threat occurring in a networked system, wherein the event descriptor object comprises a plurality of event properties;

receiving one or more entity records;

generating, using the one or more entity records, an entity descriptor object descriptive of one or more entities relevant to a security of the networked system, wherein the entity descriptor object comprises a plurality of entity properties;

incorporating, into an object graph, the event descriptor object as a first node and the entity descriptor object as a second node;

in response to determining that a value of an entity property of the plurality of entity properties matches a value of an event property of the plurality of event properties, associating, in the object graph, the event descriptor object with the entity descriptor object; and determining a course of action entity descriptor object descriptive of one or more actions for mitigating the cybersecurity threat, wherein the object graph comprises a link between the event descriptor object and the course of action entity descriptor object.

* * * * *

UNITED STATES PATENT AND TRADEMARK OFFICE
CERTIFICATE OF CORRECTION

PATENT NO. : 11,874,872 B2
APPLICATION NO. : 16/660217
DATED : January 16, 2024
INVENTOR(S) : Andrew Eggleton et al.

It is certified that error appears in the above-identified patent and that said Letters Patent is hereby corrected as shown below:

In the Specification

In Column 5, Line 57, delete "thereof," and insert --thereof;--.

In Column 6, Line 20, delete "itself," and insert --itself;--.

In Column 13, Line 62, delete "thereof," and insert --thereof;--.

In the Claims

In Column 31, Claim 4, Line 30, delete "re cords." and insert --records.--.

In Column 32, Claim 10, Line 10, delete "requestor" and insert --request for--.

In Column 32, Claim 11, Line 32, delete "objector" and insert --object for--.

Signed and Sealed this
Ninth Day of April, 2024

*Katherine Kelly Vidal*

Katherine Kelly Vidal
*Director of the United States Patent and Trademark Office*